UNITED STATES PATENT OFFICE.

CARLETON ELLIS, OF MONTCLAIR, NEW JERSEY.

HYDROGENATED FATTY FOOD PRODUCT.

1,067,978. Specification of Letters Patent. Patented July 22, 1913.

No Drawing. Application filed September 3, 1912. Serial No. 718,228.

*To all whom it may concern:*

Be it known that I, CARLETON ELLIS, a citizen of the United States, and a resident of Montclair, in the county of Essex and State of New Jersey, have invented certain new and useful Improvements in Hydrogenated Fatty Food Products, of which the following is a specification.

This invention relates to edible oil products and relates in particular to hydrogenated oil or fat material preferably of a blended composite nature, all as is more fully hereinafter detailed.

Most oils of a vegetable nature and some animal oils contain from traces up to considerable quantities of highly unsaturated bodies, including those of the linoleic and linolenic group. These and other similar bodies are very sensitive to oxidation and lend instability to such edible oil products of this character by their tendency to change chemically and thus alter the flavor of the material. Some also contain nitrogenous or other bodies of a deleterious or toxic character which may be destroyed under certain conditions of hydrogenation so that the oil or fat becomes safely edible and without cumulative and dangerous effects when taken in large quantities for protracted periods.

For a high grade edible product a composition essentially or substantially free from the foregoing objectionable bodies is desired. This may be accomplished by very careful hydrogenation up to the degree of consistency required, in the edible product, but such hydrogenation is difficult to carry out commercially on a large scale with the assurance that the product will run uniform in quality. Therefore, I prefer to carry out the treatment by saturating these bodies with hydrogen or other harmless additive element or radical so as to cause these bodies to lose their identity and become substantially free of odor and tendency to rancidify or otherwise be decomposed.

As stated in Serial No. 714,393 filed August 10, 1912, by hydrogenating soy bean, cotton-seed or corn oil, or similar oils to materially reduce the iodin number, the more sensitive double bonds are saturated with hydrogen and thereby eliminated and oxidation tendency is reduced to a minimum. Apparently the complete elimination of all the double bond grouping of the linoleic type is more difficult than the removal of the linolenic type, so that control over this seeming selective action during hydrogenation when saturating up to a given degree of consistency from a given oil, is difficult. If, however, the oil is over hydrogenated so that a more consistent fat is required than is actually desired for an edible product, the unstable bodies thus may be completely transformed, that is to say they are chemically converted into different chemical compounds. By this over or super hydrogenation the linoleic as well as the linolenic and insolinolenic bodies and the like are substantially completely transformed and other desirable deep seated reactions occur which afford a product possessing useful characteristics. In order to secure the degree of consistency desired I may cool the hot hydrogenated fat gradually to about 30° C. when the temperature may be maintained between 25° C. to 35° C. or so for several hours to induce crystallization or balling of the high melting point compound. The mass is then pressed in the manner well known in the art. The press cake contains the stearins and other high melting bodies produced by hydrogenation. The oil contains unchanged oleins, some hydrogenated bodies, unsaponifiable oils, etc. The extracted oil is then preferably bleached using for this purpose fullers' earth, ozone, oxygen and the like. Fish oil preferably should be treated with ozone followed by filtration in a heated condition through fullers' earth. The bleached oil may be then combined with such proportion of the stearin as gives the buttery or lard-like mass desired. Usually one to three parts of the so-called stearin is added, to about 5 parts of the oil. This mixture is preferably chilled and whipped or otherwise agitated in the presence of air or other gas, as nitrogen or pure hydrogen, to give what may be termed a vesiculated mass. Or, the super hydrogenated product may be pressed at a temperature which eliminates only a portion of the stearin-like bodies and thus affords the consistency required with the completion of the deep seated reaction occurring during hydrogenation under these circumstances. The product of the requisite consistency thus derived may best be bleached with fullers' earth or other bleaching agents or otherwise treated as by blowing with superheated steam at 150° to 250° C. while subjecting the oil or fat material to greatly reduced atmospheric pressure. Such a super-hydrogenated pressed product preferably ranging from butter-like to lard-like consistency is obtained from a number of common animal and vegetable oils or mixtures of these possessing a number of desirable properties. Such products when prepared properly without forced hydrogenation at excessively high temperatures are stable in storage and are not liable to coagulate on standing with the formation of objectionable masses of granulous stearin-like bodies. The product is free from objectionable odor and does not acquire any resinous stale taste upon standing for an indefinite period, nor does it resume its original odor on standing.

Fish oil or whale oil may be hydrogenated slightly in excess and then pressed to soft tallow or lard-like consistency and bleached. The fat product will then be found free from fishy odor having a pleasant odor recalling fresh tallow. Scarcely any of the original flavor remains and the very slight tang which is usually apparent generally is not of a disagreeable nature.

Another feature of the present product is that apparently it does not on long standing act upon tin or tin-containers so that the oil becomes more or less charged with tin compound. The hydrogenated product made under these circumstances bears a considerable addition of other oils which have not been hydrogenated, or have not been subjected to the action of hydrogen; the hydrogenated product embedding and protecting those other less stable oils from the normally spontaneous reaction or changes which they are well known to frequently experience.

The product may be made capable of standing the relatively high temperatures as are incident to many culinary operations without the formation of acrolein fumes and other objectionable bodies. Another very desirable feature of the product in its preferred form is what may be termed the melting point lag, involving a seemingly peculiar lack of immediate response to temperature fluctuations which is often very pronounced and which enables the production of soft edible products not melting easily in hot weather.

Among the vegetable oils corn, cottonseed, soy bean, peanut, sesame, olive, rape, cocoanut, castor, and palm oils or animal oils such as those of lard and tallow and other oleins and palmitins with more or less stearins, all of an animal nature, fish and whale oils, codliver oil and the like may be employed either in the hydrogenated or unhydrogenated condition in compounding products under the present composition.

I have noted that when a vegetable oil such as cotton-seed oil is hydrogenated directly until of the consistency desired that on cooling it frequently tends to granulate unless chilled or very rapidly cooled. This is objectionable in culinary operations as an initial lard-like body after once heating and slow cooling in the air, often forms relatively hard granules of stearin-like bodies which look like little balls of coagulated material and separating as they do from the fluid oil under some circumstances give the product the appearance of having curdled or decomposed. By super-hydrogenating and pressing to the point required the granulating stearins or stearin-like bodies are eliminated to a greater or less extent and less easily crystallized or non granulating stiffening bodies remain, tending from their amorphous texture to maintain substantially the original consistency and appearance of the product in repeated culinary use. Ordinarily, however, I prefer to secure a product of a titre expressed as the solidifying point of said product of a range of approximately from above 15° C. to below 35° C. It, of course, may vary within still greater limits according to climate and seasonal variations of atmospheric temperature. In general a product having a titre of from 25° C. to 28° C. is well suited as lard substitute or lard compound. It should be remembered that the titre referred to is that not rigidly precise thermometric value derived by cooling some of the melted product (not the fatty acids) and taking the point where the falling thermometric column becomes stationary which is that point where solidification takes place. The titre usually is considerably lower than the melting point. For the manufacture of butter substitutes other conditions obtain and a softer product is desired, one in particular which when taken into the mouth immediately melts and does not leave a disagreeable greasy sensation on the tongue and walls of the mouth. In the manufacture of hydrogenated butter substitute as I have set forth in U. S. Patent No. 1,038,545 of Sept. 17, 1912, the step of over or super-hydrogenation is desirable. In the above mentioned patent of which the present application is in a measure a continuation as regards the step of over hydrogenation, etc., I have specified in particular the manufacture of a butter substitute involving the incorporation of hydrogenated edible oil and milk material. It is also possible to make a butter-like composition without the use of milk material, but consisting of simply edible hydrogenated oil with perhaps some flavoring material as valerian ester and the like, salt and coloring matter. The mixture of edible hydrogenated vegetable oil with ordinary butter in a proportion of two parts of the oil to one part of the butter provides very suitable butter-like material at a relatively low cost. Hydrogenated corn oil, because of its flavor is desirable for use in this way.

While the procedure of making an edible butter or lard-like compound of the present invention varies somewhat depending upon the oils or fats treated and degree of consistency desired, etc., for illustrative purposes, an edible mixture is prepared by taking cotton-seed oil and corn oil in the proportion of 4 parts of the former to one part of the latter. The almost tasteless character of cotton-seed oil when highly refined and also when hydrogenated is improved by the addition of corn or peanut oil giving the product a faintly nutty flavor. The mixture is super-hydrogenated by the action of hydrogen in the presence of a catalyzer to a titre of 35° C. to 40° C. This is cooled and pressed to bring the product to a titre of about 26° C. It is agitated with 5% more or less of fullers' earth at a temperature of 100° C. or so for about 5 minutes. Or the pressed super-hydrogenated cotton-seed oil product obtained in this way may be mixed with about 15% or 20% of corn oil to secure the titre desired.

I do not limit myself solely to the use of superhydrogenated oils or similar fatty bodies. Additions in various proportion of the different kinds of oils above mentioned may be made as desired to secure mixtures of hydrogenated and ordinary oils. The defects of the ordinary oils when not added in large quantities may be in a measure compensated by the presence of the hydrogenated product and more particularly by a product which has been super-hydrogenated and pressed.

Wherever the terms oils and fat have been used herein, they are applied as is common in this art in a sense which is substantially synonymous. In the case of oils containing considerable quantities of fatty acids, I prefer to distil these with steam under reduced atmospheric pressure, to remove the acid material, leaving the fatty mixed esters in substantially pure condition and in a form readily susceptible to the action of hydrogen. By the present invention cocoanut oil may be used as a blending material and may be hydrogenated or not according to circumstances.

The introduction of hydrogen into cocoanut oil is rather difficult, and the complete hydrogenation of this oil is sometimes troublesome. In order to effect a complete treatment of this oil and other oils which are rather resistant to hydrogenation, I preferably dissolve the oil in a solvent which is a good solvent relatively speaking, for hydrogen gas. Many oils, glycerin, water and the like, dissolve only very small quantities of hydrogen gas. On the other hand, solvents such as ordinary alcohol, wood alcohol, ethyl acetate, benzol, xylol, toluol, carbon tetrachlorid and the like, absorb hydrogen more readily. Some of the solvents, such as alcohol, do not mix readily with oils such as cotton-seed oil in the cold, but when heated to a temperature such as is employed in hydrogenation, the oil and alcohol or other similar body, mix readily and the thinning or solvent material serves as an absorbing body for the hydrogen gas. The advantage of operation in this way is that even though the catalyzer becomes coated with oil which is saturated with hydrogen gas, the thinning solvent acts as a carrier of hydrogen gas to the catalyzer and from thence to the unsaturated oil. Also it renders the oil more mobile, so that diffusion takes place to a greater extent, and the saturated material as formed, thus diffuses away from the catalyzer and permits the unsaturated material to come in contact therewith. Some of the solvents referred to, show a tendency within certain limits, of absorbing greater quantities of hydrogen with increase of temperature. The alcohols, as well as the hydrocarbons mentioned, show this peculiarity which is advantageous because it is usually true that increase in temperature causes gases to become soluble in liquid materials.

Hydrogenated cocoanut oil alone or ordinary refined cocoanut oil mixed with hydrogenated cotton-seed, corn or peanut oil and the like may be used as a fluxing agent for chocolate in the manufacture of confectionery. The melting point of the fatty flux should preferably be about 90° F. to 100° F. Hydrogenated unpressed cocoanut oil or hydrogenated cocoanut oil olein or stearin may be used in a similar manner.

The manufacture of the coating of chocolate creams calls for a relatively high melting point fat which incorporates readily with chocolate and does not impair the flavor thereof. Cocoa butter is especially desired on this account, but is relatively expensive. Cocoanut oil melts so easily that in hot weather candies made with it melt very quickly when handled. Cocoanut oil also has a tendency to rancidify.

By hydrogenation of an oil assimilable with chocolate the exact melting point desired may be obtained and a stable composition secured. By over-hydrogenating as above set forth, still better fatty bases are derived. An illustrative composition is the following: super-hydrogenated and pressed cotton-seed oil 1 part, cocoanut oil 2 parts, cocoa butter 1 part, chocolate base *q. s.*

Or the following: cocoanut oil 4 parts, hydrogenated cotton-seed oil stiffener (or sufficient to make the melting point of the mixture about 100° F.) 1 part, chocolate base q. s. The stiffener referred to is preferably the press cake from pressing super-hydrogenated oil.

In the manufacture of butter substitutes using cotton-seed oil it is desirable to hydrogenate until the iodin number falls to 80° or thereabout. The oil may then be cooled to about 30° C. or so, and allowed to stand for a time and then pressed to remove the excess of stearin. It is then melted or warmed to render it entirely fluid, and is incorporated with the milk material. Suitable material of this character is ordinary full milk or skim milk or butter milk, sterilized milk, sour milk which has been specially fermented using lactic acid ferment and the like. For example, ferments such as *Bacillus butyricus* or *bulgaricus* and the like may be used. In a similar manner Kafir grains or ferment may be employed to act upon the milk until a suitable transformation in its quality has been secured. Sour milk is especially desirable because of the excellent butter taste which it gives to product. Condensed milk having perhaps fifty per cent. of its water removed is sometimes desirable because of the readiness with which it blends with the oily material. Salt to the extent of 2% to 8% or thereabout, may be added according to the degree of saltiness desired. Suitable coloring material such as ordinary butter color may be likewise added. Also a flavoring compound such as cumarin and propionic, butyric and capronic acid, as well as various esters and aldehydes such as those of valerian and capryl bodies may be added. In order to give the product the property of browning, when heated in a skillet, bodies such as egg yolk, milk sugar, lecithin and finely powdered casein and the like may be introduced.

Of the oils mentioned cotton-seed and peanut oil are especially suitable, while corn and soy bean oil also are adapted for use in this way. Various other oils may also be incorporated if desired, such as lard and tallow oil, almond oil, olive oil, rape seed oil, cocoanut oil and the like may be added in various proportions, although in general it should be stated that the product essentially or preferably should consist of vegetable oil. If oils other than those set forth as preferable in the present invention are employed, it is desirable also to hydrogenate these to improve their odor. Cocoanut oil is not generally speaking desirable, because of the fact that it has a tendency to become rancid in the presence of moisture. The flavor of cocoanut oil is, however, desirable and this oil may be used more or less particularly if somewhat hydrogenated, or if substantially free of moisture. With less than 5% moisture a refined oil remains neutral for some time.

A "dry" butter substitute of about the melting point of butter may be made by compounding 12 parts soft hydrogenated cotton-seed oil; 3 parts of refined cocoanut oil and 3½ parts of Lagos palm oil. Or, 6 parts hydrogenated cotton-seed oil and 6 parts or more of cocoanut oil may be mixed and heated to 212° F. or so to remove moisture.

Palm oil when freed from undesirable excess of free fatty acids and then hydrogenated, forms a desirable blending fat for butter substitutes. It mixes with hydrogenated cotton-seed oil without "seeding" on standing, that is, does not granulate and separate in an undesirable way. While raw palm oil is rather unpalatable, the refined hydrogenated product is adapted for use as an edible oil. A palm oil butter substitute containing milk material may be prepared by substituting this oil refined and preferably hydrogenated in the above milk-containing formulas.

A substantially dry butter substitute may be made from hydrogenated cotton-seed oil 15 parts; palm oil 4 parts; and butter fat 1 part, with which may be incorporated salt and special flavoring agents. Hydrogenated fish or whale oil similarly may be used as a basis of moisture-containing or dry butter substitutes and other edible products. Before treating crude oil of this character with hydrogen, it preferably should be washed with dilute alkali to remove free fatty acids.

It is of course obvious that in preparing oils or fats for edible purposes no great amount of free fatty acid should be present, otherwise the flavor is objectionable. Small amounts of fatty acids such as oleic, linoleic and linolenic acids by hydrogenation are converted into acids of less flavor so that a completely neutral oil is not always required from this standpoint. Hydrogenation progresses somewhat more easily with neutral oils than with those containing large amounts of free fatty acids and in the use of metal catalyzers less of the metal is taken into solution in the oil when the latter is neutral. Purification of the oil to remove free fatty acids or bodies detrimental to the life of the catalyzer may therefore precede the step of hydrogenation. It should be stated, however, that with some fats at least stability is in part dependent on the amount of handling the fat has experienced. Minimizing the handling tends to stability in flavor. The treating receptacle in which hydrogenation is carried on preferably should be lined with enamel or nickel or some material which has not anticatalytic action.

For making edible products metallic iron is oftentimes unsuitable for use when the catalyzer comes in direct contact with it, sometimes having a repressing action on the activity of the catalyzer and occasionally showing a tendency to discolor the edible oil. Suitable catalyzers for the present purpose, in addition to the nickel catalyzer above mentioned, are other metallic catalyzers such as copper, platinum, and paladium, and the like. Various oxids such as those of nickel, copper, iron, and the like as well as various salts of these and other metals, may be used as catalyzers for different oils or other unsaturated materials. In the treatment of fish oil, whale oil and the like, it is recommended that a mixed catalyzer consisting of either nickel and cobalt in the metallic condition, or mixtures of nickel and cobalt oxid be employed. By using an iron catalyzer, at a temperature of about 250° C., polymerization of the oil with simultaneous hydrogenation may sometimes be secured in the case of certain oils. Similarly, with other catalyzers at different temperatures, the same effects may be secured. This results in a double hardening of the oils, that due to hydrogenation, and that caused by polymerization.

In the manufacture of edible oils calling for hydrogenation at a relatively low temperature in order to not impair the flavor of the oil by over heating, I preferably employ a catalyzer consisting of a mixture of metallic nickel and nickel oxid, the two being intimately incorporated and preferably in the following way: Nickel oxid or hydrate is ignited in a current of hydrogen to reduce same, preferably to completion. The first, third, or half of the oxygen is removed at a temperature of 380° to 400°, while the balance of the oxygen is removed only at a temperature of 425° C. to 450° C. and upward. Catalyzer prepared at these high temperatures is not very sensitive and in improving its sensitiveness, I expose same to the air, preferably when in a heated condition and allow it to burn. This material is then reduced with hydrogen when it will be found that reduction takes place much more easily at lower temperatures, so that at temperatures of 325° C. or 330° C. about one-half of the oxygen may be removed to give an intimately incorporated mixture of metallic nickel combined with nickel oxid, or certain of the sub-oxids; which mixture is particularly effective for the treatment of edible oils to secure hydrogenation up to a lard-like consistency or higher, at relatively low temperatures.

In the preparation of oils or solid fats for edible purposes such for example as so-called vegetable lard, it is desirable usually, to prepare a product having a constant melting point; that is each lot of the product should have approximately the same melting point. This may be accomplished by having on hand a quantity of oil which has been under-hydrogenated so that the product issuing from the apparatus may be mixed with more or less of either of these preparations, in order to modify the melting point and render it uniform. In case an oil has been over-hydrogenated, and is too hard, it is usually undesirable to add to it some of the original oil, because the latter has not been deodorized by hydrogenation, and therefore imparts an undesirable odor or flavor to the product. By partial hydrogenation, the odor and flavor are usually so improved that the addition of such partially hydrogenated oil does not materially change or impair the flavor of the final product. Such products as well as some of the simply hydrogenated oils because of their ease of emulsification or blending properties may be used for making artificial cream or ice cream. The former may be made from milk or skim milk by raising the fatty content through the addition of hydrogenated oil or fats with or without other oily material so that from about 18% to 30% of fatty material is present. In the case of ice cream the hydrogenated oil or fat may be added to or combined with the usual components of ice (lacking fatty material) including milk, cream, sugar, fruit juices or flavors, eggs, thickeners, etc. Polymerized hydrogenated cotton oil is a serviceable addition.

The hard product derived by super-hydrogenation and pressing forms a new article of manufacture, it having a composition different in certain respects from other fatty bodies. For stiffening edible oils, making soaps, high flash lubricants and the like, this pressed material may be used to advantage. The high melting point fats obtained by superhydrogenation with or without pressing are readily saponified giving high melting point fatty acid mixtures suitable for candle stock. The hydrogenation direct of unsaturated fatty acids is often difficult and the catalyzer is usually quickly affected. By hydrogenation first and then saponifying by the autoclave process or otherwise these objections are overcome. By super-hydrogenating an edible oil and pressing, there is obtained on the one hand an edible fat of the proper titre and melting point and other desired properties, and on the other hand a product from which fatty acids and glycerin may be derived.

The use of water gas (blue gas) per se for hydrogenation of oils or fats intended for edible purposes is not to be recommended. In this case it is better to compress the well-purified gas to remove by liquefaction a large portion of the carbon monoxid. The gas of reduced or slight carbon monoxid content obtained in this way may then be employed for hydrogenation, or if desired first be heated in the presence of caustic alkali or an alkali solution to eliminate practically all of the carbon monoxid.

The super hydrogenation of fish oil converts the esters of the series of fatty acids $C_nH_{2n-8}O_2$ into comparatively odorless saturated compounds. Glyceryl clupanodonate, a body largely responsible for the disagreeable odor of fish oil, is converted into the stearate and the latter may be removed more or less by pressing or otherwise. The resinous substances apparently formed by the oxidation of clupanodonic acid, when fish oil is exposed to the air for a considerable period, are not as easily eliminated by hydrogenation and their presence in quantity is not conductive to effective action of some catalyzers. When present in any material proportion the oil should be washed with an alkaline solution prior to hydrogenation.

Hydroxy fatty acid glycerids derived from the above mentioned oils by treatment with oxygen and hydrogen in the presence of catalyzers, may be substituted for normally hydrogenated oils in the foregoing compositions.

Very desirable compositions for use as, or in preparing, butter or lard compounds are prepared by incorporating a viscous or syrupy hydrogenated oil or fat with a more readily granulating hydrogenated oil or fat. A body or viscosity is thus imparted to the latter which not only usually improves melting point lag, but also retards or entirely suppresses spontaneous granulation. Such a viscous or syrupy product may be derived for example by moderately hydrogenating refined corn oil, especially if carried out without violent churning, as by the quiet hydrogenation which may be secured under the process of U. S. Letters Patent No. 1,026,156 of May 14th, 1812. One part more or less of this fat syrup for example, may be combined with 2 or 3 parts of hydrogenated cotton-seed oil to yield a lard substitute of excellent consistency; or the proportions may be reversed to give a major proportion of the fat syrup in which case the product is better adapted as a butter substitute, especially when combined with milk material. Similarly other oils or fats which may or may not be hydrogenated according to circumstances including olive, tallow, lard, fish, peanut, soy bean and similar oils may be incorporated with the fat syrups derived in this manner. Finally it may be stated that the compounding of one hydrogenated oil of the character aforesaid with another or with unhydrogenated oily or fatty material blending therewith often tends to overcome undesirable granulation, or improves melting point lag, or tendency to excessive solidification in cold weather, or is otherwise of benefit.

What I claim is:

1. An edible fat composition of not exceeding a substantially lard-like consistency comprising hydrogenated corn oil of substantially viscous consistency and edible fatty material blending therewith.

2. An edible fat composition of not exceeding a substantially lard-like consistency comprising hydrogenated vegetable oil of carrying hydrogenated corn oil and edible fatty material blending therewith; said composition being stable and substantially free from tendency to spontaneous coagulation.

3. An edible fat composition of substantially lard-like consistency comprising hydrogenated corn oil of substantially viscous consistency and edible fatty material blending therewith.

4. An edible fat composition of stable consistency comprising a viscous hydrogenated oil comprising corn oil and a hydrogenated oil of a substantially granular tendency blending therewith.

5. An edible fat composition comprising hydrogenated corn oil of highly viscous consistency and hydrogenated cotton-seed oil.

6. An edible fat composition of a least soft buttery consistency comprising a granular-tending hydrogenated oil and a consistency stabilizer blending therewith.

7. An edible fat composition of soft buttery to lard-like consistency comprising a granular-tending hydrogenated oil and a consistency stabilizer comprising moderately hydrogenated corn oil of a substantially highly viscous consistency.

8. An edible fatty composition comprising edible hydrogenated corn oil and edible vegetable oil material blending therewith, said composition possessing a marked melting point lag.

9. An edible fatty composition comprising edible hydrogenated corn oil and edible vegetable oil material blending therewith, said composition possessing a marked melting point lag, being free from characteristic odor of origin and odors derived during hydrogenation, being free from rancid flavor and substantially neutral and being for an indefinite period substantially unchanged with respect to odor and flavor.

10. An edible fatty composition comprising edible hydrogenated corn oil and edible vegetable oil material blending therewith, said composition possessing a marked melting point lag and being substantially neutral and free from odor of origin.

11. An edible fat composition consisting of composite fatty material of not exceeding a substantially lard-like consistency comprising edible hydrogenated corn oil said composition possessing a marked melting point lag and being substantially free from odor of origin.

12. An edible fat composition consisting of composite fatty material of substantially lardlike consistency comprising edible hydrogenated corn oil, said composition possessing a marked melting point lag and being substantially neutral and free from odor of origin.

13. An edible fat composition consisting of composite fatty material of a titre of about 28° C. comprising edible hydrogenated corn oil, said composition possessing a marked melting point lag and being substantially neutral and devoid of odor of origin.

Signed at Montclair, in the county Essex and State of New Jersey this 31st day of August A. D. 1912.

CARLETON ELLIS.

Witnesses:
A. H. NEY,
A. A. WELLS.